United States Patent [19]
Park et al.

[11] Patent Number: 5,336,959
[45] Date of Patent: Aug. 9, 1994

[54] IMPACT ZONE DETECTION DEVICE

[75] Inventors: Kyung-Tae Park, Berwyn, Pa.;
Raymond F. Gastgeb, Doylestown, Pa.

[73] Assignee: The Whitaker Corporation, Wilmington, Del.

[21] Appl. No.: 990,359

[22] Filed: Dec. 11, 1992

Related U.S. Application Data

[63] Continuation of Ser. No. 758,443, Sep. 5, 1991, abandoned, which is a continuation of Ser. No. 476,864, Feb. 7, 1990, abandoned, which is a continuation-in-part of Ser. No. 285,190, Dec. 16, 1988, abandoned.

[51] Int. Cl.⁵ .................................... H01L 41/113
[52] U.S. Cl. .................................... 310/328; 310/331; 310/332; 310/338; 310/339; 310/800
[58] Field of Search ............. 310/324, 330, 331, 332, 310/338, 339, 800; 273/25, 264

[56] References Cited

U.S. PATENT DOCUMENTS

| | | | |
|---|---|---|---|
| 2,302,081 | 11/1942 | Weitmann | 310/328 |
| 2,925,582 | 2/1960 | Mattei et al. | 340/16 |
| 3,392,979 | 7/1968 | Wilska | 310/339 |
| 3,489,413 | 1/1970 | Groder et al. | 273/102.2 |
| 3,548,314 | 12/1970 | Mitchell | 310/319 |
| 3,690,661 | 7/1972 | Scharz et al. | 310/326 |
| 3,790,709 | 2/1974 | Heywang | 310/328 |
| 3,808,364 | 4/1974 | Veith | 310/328 |
| 3,819,962 | 6/1974 | Ivey et al. | 310/8.3 |
| 3,874,664 | 1/1975 | Faurot et al. | 273/29 |
| 3,971,250 | 7/1976 | Taylor | 73/88.5 |
| 4,067,019 | 1/1978 | Fleischer et al. | 346/75 |
| 4,082,985 | 4/1978 | Bolhuis | 310/319 |
| 4,227,182 | 10/1980 | Ogasawara et al. | 340/870.37 |
| 4,363,991 | 12/1982 | Edelman | 310/338 |
| 4,527,105 | 7/1985 | Shiraishi | 310/324 |
| 4,542,325 | 9/1985 | Kobayashi et al. | 310/324 |
| 4,657,250 | 4/1987 | Newland et al. | 273/376 |
| 4,659,090 | 4/1987 | Kustanovich | 273/376 |
| 4,675,569 | 6/1987 | Bowman et al. | 310/328 |
| 4,675,959 | 6/1987 | Sprout | 29/25.35 |
| 4,761,005 | 8/1988 | French et al. | 273/1 GC |
| 4,770,527 | 9/1988 | Park | 273/26 A |
| 4,801,835 | 1/1989 | Nakaya et al. | 310/800 |
| 4,814,661 | 3/1989 | Ratalaff et al. | 310/328 |
| 4,824,107 | 8/1989 | French | 310/800 |
| 4,835,435 | 5/1989 | Yeung et al. | 310/328 |
| 4,835,747 | 5/1989 | Billet | 310/800 |
| 4,915,384 | 4/1990 | Bear | 273/26 A |
| 4,928,264 | 5/1990 | Kahn | 310/800 |
| 4,941,662 | 7/1990 | DePerna | 273/25 |
| 4,959,807 | 9/1990 | Thompson et al. | 364/565 |

FOREIGN PATENT DOCUMENTS

526763 9/1972 Switzerland.
1155801 6/1969 United Kingdom.

*Primary Examiner*—Thomas M. Dougherty

[57] ABSTRACT

A device for determining which zone on a target has been struck by an object. The device is made of a frame, and a flexible support means which is mounted on the frame, and is disposed in the path of a moving object. A transducer made of piezoelectric film, coated with a conductive coating on each of its surfaces to form electrodes, is mounted on the flexible surface. Attached to the electrodes of the transducer are leads which transmit electrical pulses to a signal processing unit. An object striking the target produces an electrical pulse which is translated by the signal processing unit and which determines the zone on the target which was struck by the object.

5 Claims, 5 Drawing Sheets

IMPACT ZONE DETECTION DEVICE

This is a continuation of co-pending application(s) Ser. No. 07/758,443 filed on Sep. 5, 1991, now abandoned, which, in turn, is a continuation application of Ser. No. 07/476,864 filed Feb. 7, 1990 (now abandoned) which, in turn, is a continuation-in-part of Ser. No. 07/285,190 filed Dec. 16, 1988 (now abandoned).

BACKGROUND OF THE INVENTION

The present invention is directed to a device for detecting which zone on a target has been struck by a moving object, for example, a baseball. In particular, the invention uses piezoelectric film as the detectors.

There are various types of target devices known which utilize piezoelectric film. However, these target devices detect impact only, and do not indicate a location or zone of impact. In addition, many of these target devices are consumed or destroyed by impact and are not designed to be reused.

Devices designed specifically to indicate zone of impact do exist, of course, but they are very complicated devices. They use infrared or electro-optical sensors, making the targets very bulky and expensive to manufacture.

The present invention provides an inexpensive, easy-to-manufacture target which will indicate the exact zone in which an object strikes the target. The invention can be used for sporting events such as baseball, soccer, or ice hockey to indicate the exact area where a ball crosses the plate or enters a goal. The invention can also be used to indicate the area on a target which is struck by a hand or foot when delivering a blow in martial arts or boxing-type sports. The invention also has application in toys and in certain industries where detection of a zone of impact of an object on a target, or other object, is important.

SUMMARY OF THE INVENTION

The present invention is a device for detecting which zone on a target has been struck by a moving object, and comprises a flexible support surface mounted on a frame, transducer means mounted on the flexible support surface, and signal processing means. The device is disposed in the path of a moving object. The transducer means generates a signal when the object strikes the device. The signal processing means is responsive to this signal generated by the transducer means, and evaluates the signal, determining which zone on the target was struck by the object.

DESCRIPTION OF THE DRAWINGS

For the purpose of illustrating the invention, there is shown in the drawings a form which is presently preferred; it being understood, however, that this invention is not limited to the precise arrangements and instrumentalities shown.

DESCRIPTION OF THE INVENTION

Figure 1:
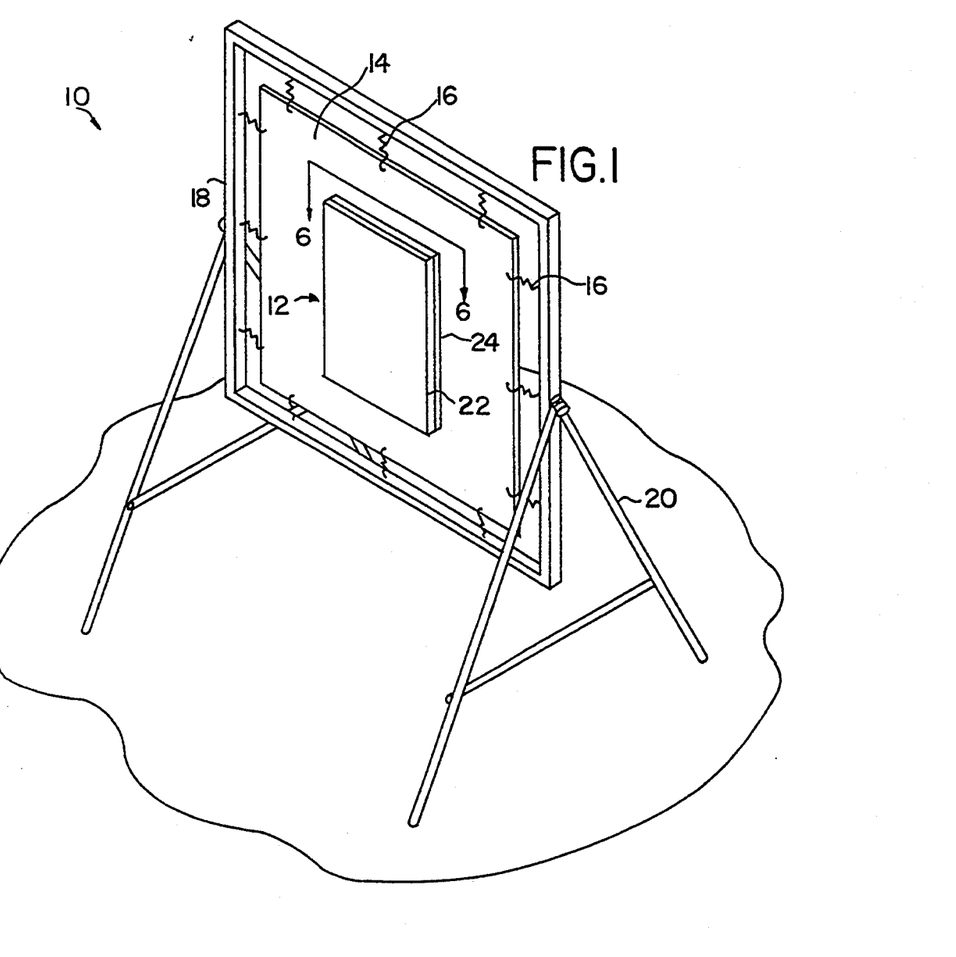
FIG. 1 is a perspective view of one embodiment of the impact zone detection device apparatus as constructed in accordance with the present invention.

Referring now to the drawings, wherein like numerals indicate like elements, there is shown in FIG. 1 an impact zone detection device 10 according to the invention. The device 10 comprises a target surface in the form of a transducer 12 mounted on a flexible sheet 14. Sheet 14 may be a fabric, such as canvas, stretched tightly and mounted with springs 16 on a frame 18, creating a trampoline-like structure. Alternatively sheet 14 may be a compliant, easily compressible foam or rubber material, mounted on frame 18 in an appropriate manner.

Frame 18 may be mounted on a stand 20, or suspended from a support or fixed to a wall, for example, to support device 10 at a height and orientation which is appropriate for its intended use. For example, to determine whether a baseball pitch falls within or outside the strike zone, device 10 is preferably positioned in the approximate area of the strike zone, whereas to determine the zone in which a blow is delivered in boxing or in a martial arts discipline, device 10 is positioned at the height of a human torso.

Transducer 12 may be a single layer of piezoelectric film, or a bimorph laminate of two layers of piezoelectric film. Transducer 12 can also be a multimorph (i.e., more than two layers) laminate of piezoelectric film. For convenience, the invention is described with transducer 12 being a bimorph laminate of two piezoelectric film layers 22 and 24 (See FIG. 1). Film layers 22 and 24 may be a polyvinylidene fluoride polymer, or PVDF, or any other piezoelectric polymer material. Each layer 22, 24 has an electrode coating on its opposite surfaces which provides an intimate electrical contact with the piezoelectric film. The electrode coating is very thin and can be applied to the film by any number of well known metallization techniques such as screen printing of conductive inks, vacuum deposition, and the like. Because of relative scale, the electrode coatings are not separately illustrated in the drawings.

Figure 5A:
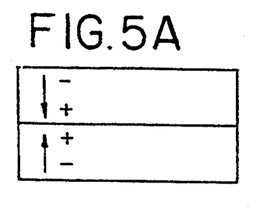
FIGS. 5A–5C illustrate in schematic form different transducer configurations suitable for use with the present invention.
Figure 5B:
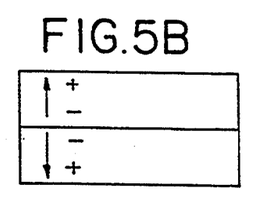
Figure 5C:
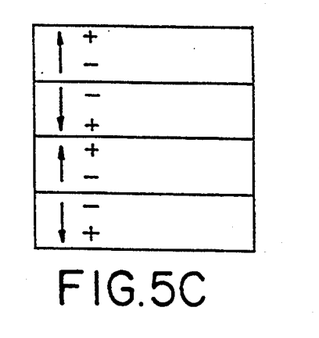

Film layers 22 and 24 have a known polarity. As is known in the art, the process of forming piezoelectric polymer film involves the use of a poling process. See, for example, U.S. Pat. No. 4,675,959, assigned to the same assignee as the present invention, for one poling process. During poling the film is subjected to an intense electric field which aligns the polar axes of the individual crystallites within the film, giving the film a polarity relative to the internal dipole orientation of the crystallites. Dipoles are aligned along the axis of poling, which is typically an axis normal to the plane of the piezoelectric film. FIGS. 5A and 5B show two possible bimorph configurations and FIG. 5C shows a multimorph configuration of poled piezoelectric polymer film layers. The polarity of each film layer is depicted by a vertical arrow which represents the poling field direction. The arrow tail corresponds to the surface of the film which was subjected to a positive poling potential and, as a result, has a predominantly negative charge. The arrow tip corresponds to the surface of the film which was subjected to a negative poling potential and, as a result, has a predominantly positive charge.

In the present invention, film layers 22 and 24 are layered in series opposed configuration and laminated together to form a bimorph. In series opposed configuration, the sides of the film which face each other have the same charge. Thus, film layers 22 and 24 may be laminated in positive series opposed configuration, with their positively charged surfaces facing each other (as seen in FIG. 5A), or in negative series opposed configuration, with their negatively charged surfaces facing each other (as seen in FIG. 5B). For convenience, the invention is described with the piezoelectric bimorph transducer 12 being laminated in negative series opposed configuration. Layers 22 and 24 are laminated together in any suitable manner which will ensure good electrical contact between the layers such as, for example, with a conductive adhesive.

An inherent advantage of the bimorph laminate described above is its insensitivity to noise in the form of random vibration. When constructed in a series opposed configuration as described above, the bimorph transducer 12 offers common mode rejection. That is, as those skilled in the art will understand, bimorph transducer 12 functions as a differential input device in that it ignores inputs that appear simultaneously and in phase on both film layers 22 and 24, as would be the case with noise generated by random vibrations (such as vibrations induced by wind). However, non-simultaneous or out-of-phase inputs, such as those caused by an object striking transducer 12, are sensed and generate an output signal, as will be more fully described below.

For convenience, the present invention will be described in terms of a baseball target for detecting strikes and balls. However, it is understood that the invention is in no way limited to this configuration or use, and may be applied in targets for numerous other sports or in any other setting where it is desired to sense and indicate zone of impact.

Figures 2, 3:
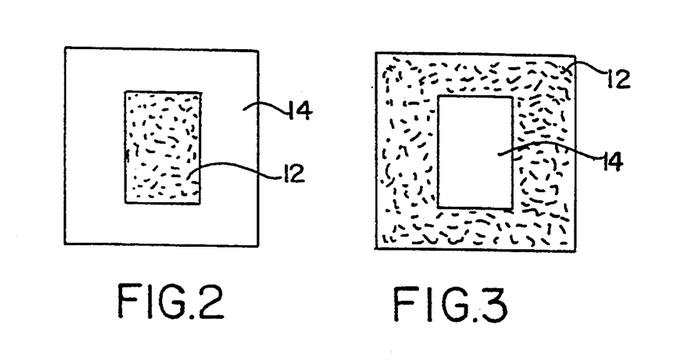
FIG. 2 is front view of a target means in accordance with one embodiment of the present invention.
FIGS. 3 and 4 are front views of the target means in accordance with alternate embodiments of the present invention.

In the first embodiment, as seen in FIGS. 1 and 2, transducer 12 is mounted on flexible sheet 14 so that it covers the entire strike zone area of the target. Impact of a baseball on the target will cause transducer 12 to generate an electrical output signal. To detect and process this signal, film layers 22 and 24 of transducer 12 are connected to a polarity detector (not shown).

Figure 6:
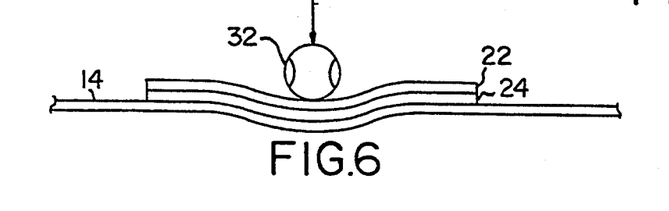
FIG. 6 is a sectional view of a portion of the invention taken along lines 6—6 in FIG. 1, illustrating the mechanical operation of one embodiment of the invention.
Figure 7A:
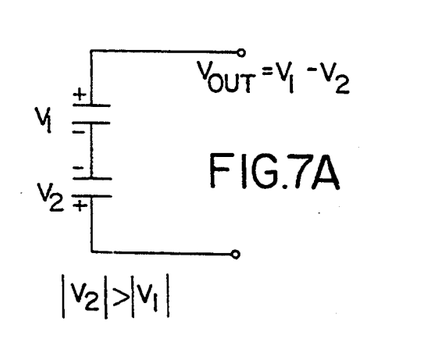
FIG. 7A is a circuit diagram illustrating the electrical output response resulting from impact of an object on the detection device of the invention as shown in FIG. 6.
Figure 7B:
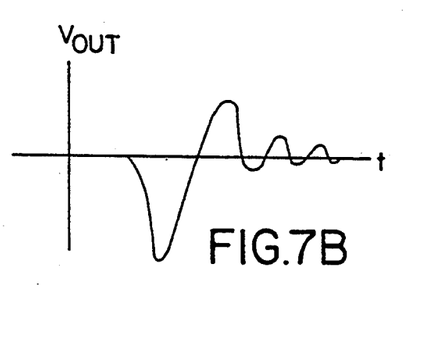
FIG. 7B is a waveform illustrating the electrical output response resulting from impact of an object on the detection device of the invention as shown in FIG. 6.

In operation, a baseball or other object 32, whose zone of impact on the target is to be determined, is directed at the target. The object will strike either transducer 12, or that portion of sheet 14 not covered by transducer 12. If object 32 strikes transducer 12 directly, as shown in FIG. 6 (i.e., a "strike" is thrown), the force caused by the impact produces both compressive and tensile strains on film layers 22 and 24. The resulting deformation, as shown in FIG. 6, causes a change in the surface charge density of each of the film layers. Thus, a voltage $V_1$ appears between the electrode coatings on the opposite surfaces of film 22 and a voltage $V_2$ appears between the electrode coatings on the opposite surfaces of film 24 (see FIG. 7A). Film 24 deforms more under impact than film 22 and, as a result, generates a greater magnitude voltage output $V_2$. The total voltage output, $V_0$, is equal to $V_1+V_2$. Because transducer 12 is a bimorph layered in negative series opposed configuration, the polarity of the total output voltage $V_0$ is negative, as can be seen from the output waveform in FIG. 7B. From Kirchoff's Voltage Law, $V_2-V_1+V_0=0$, or $V_0=V_1-V_2$, where $V_1$ is the voltage produced across the electrode coatings of film 22, $V_2$ is the voltage produced across the electrode coatings of film 24, and $V_0$ is the total output voltage which is then input into the polarity detector. When a "strike" is thrown, $V_2$ will be greater than $V_1$, as a result of the structure of transducer 12. Thus, a negative value for $V_0$ is input into the polarity detector and the device indicates that a "strike" was thrown.

Figure 8:
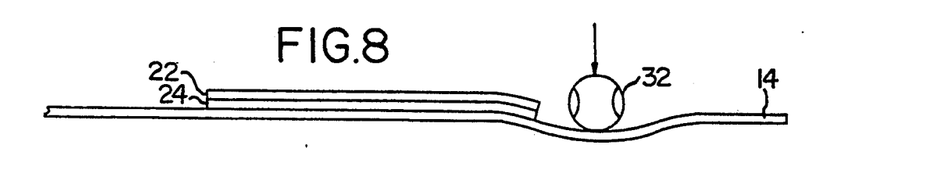
FIG. 8 is a sectional view of a portion of the invention taken along lines 6—6 of FIG. 1, illustrating the mechanical operation of one embodiment of the invention.
Figure 9A:
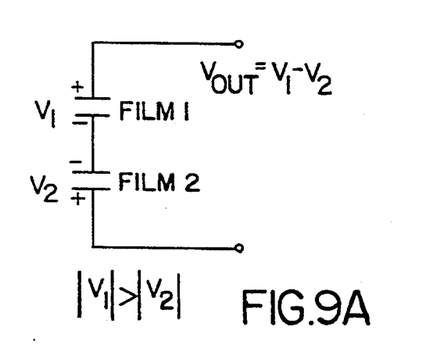
FIG. 9A is a circuit diagram illustrating the electrical output response resulting from impact of an object on the detection device of the invention as shown in FIG. 8.
Figure 9B:
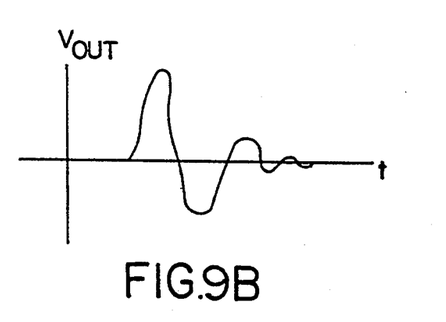
FIG. 9B is a waveform illustrating the electrical output response resulting from impact of an object on the detection device of the invention as shown in FIG. 8.

Alternatively, if object 32 strikes an area of the target which is not covered by transducer 12, as shown in FIG. 8 (i.e., a "ball" is thrown), the force created by the impact causes film layers 22 and 24 to again deform, but in a different manner. In this case, layers 22 and 24 are subjected primarily to tensile strains. The resulting deformation causes a change in the surface charge density of each of the film layers. Thus, a voltage $V_1$ appears between the electrode coatings on the opposite surfaces of film 22 and a voltage $V_2$ appears between the electrode coatings on the opposite surfaces of film 24 (See FIG. 9A). Film 22 deforms more than film 24, so that voltage signal $V_1$ is greater in magnitude than voltage signal $V_2$. The total output voltage, $V_0$, is equal to $V_1+V_2$. It can be seen from the output waveform in FIG. 9B that in this case the polarity of $V_0$ is positive. From Kirchoff's Voltage Law, $V_2-V_1+V_0=0$, or $V_0=V_1-V_2$. When a "ball" is thrown, $V_1$ will be greater than $V_2$, as a result of the structure of transducer 12. Thus, a positive value for $V_0$ is input into the polarity detector and the device indicates that a "ball" was thrown.

The same result can be achieved by covering the entire ball zone of the baseball target with a transducer 12 while leaving the strike zone uncovered (See FIG. 3). In this case a direct hit on the transducer (i.e., a "ball") would still generate a negative output voltage. However, in this embodiment it is understood that a negative value for $V_0$ would cause the device to indicate that a "ball" was thrown instead of a "strike". Likewise, an impact in the uncovered strike zone would produce a positive value for $V_0$ and the device would indicate that a "strike" was thrown.

Figure 4:
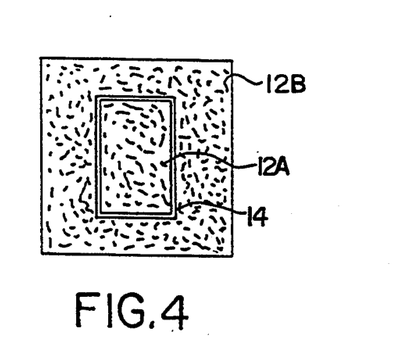
Figure 10:
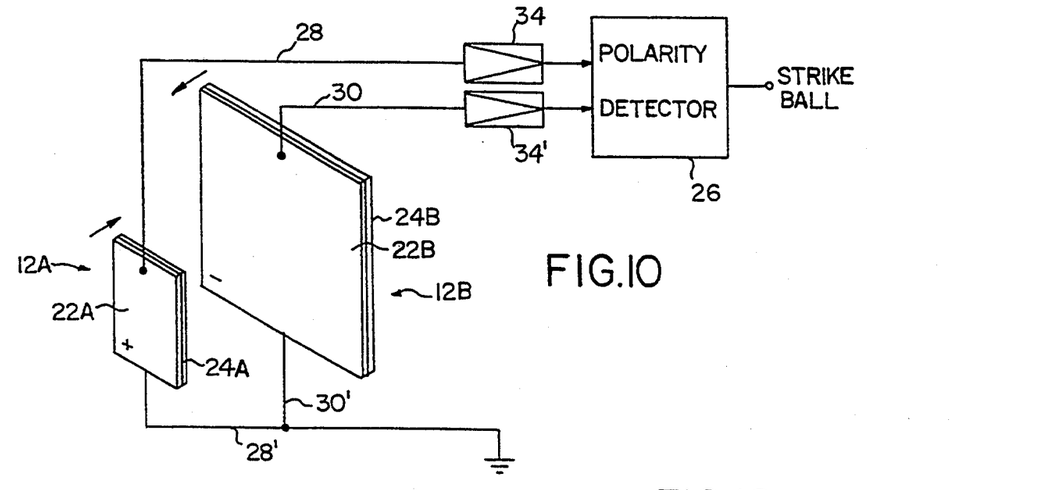
FIG. 10 is a schematic diagram of the signal processing circuit for one embodiment of the invention.

Bimorph transducers 12A and 12B can also be placed over both the strike zone and the ball zone of the target, respectively (see FIG. 4). Preferably, the two transducers 12A and 12B are electrically decoupled, or isolated, from one another so that there is no electrical contact between them. The strike zone of the target can also be mechanically decoupled from the ball zone, for example, by placing transducers 12A and 12B on different sheets, to minimize the mechanical cross-talk between the two zones. Transducer 12A is preferably a bimorph laminate of two piezoelectric film layers, 22A and 24A. Transducer 12B is also preferably a bimorph laminate of two piezoelectric film layers, 22B and 24B. The polarity of the bimorph laminate comprising transducer 12A is opposite that of the bimorph laminate comprising transducer 12B. That is, if transducer 12A is layered, for example, in negative series opposed configuration, then transducer 12B is layered in positive series opposed configuration, and vice versa. For convenience, the invention is described herein with the bimorph transducer 12A being laminated in negative series opposed configuration and the bimorph transducer 12B being laminated in positive series opposed configuration. As seen in the diagram in FIG. 10, electrical conductors 28 and 28' connect film layers 22A and 24A of transducer 12A to a comparator 34 and to ground, respectively. For transducer 12B, electrical conductors 30 and 30' connect film layers 22B and 24B to a comparator 34' and to ground, respectively. Each pair of conductors is attached to the electrode coatings on the film layers. The electrode coatings, which are extremely thin and would be difficult to see in the drawings because of the drawing scale, are omitted from the drawing for clarity. However, it is understood that each film layer 22A, 24A, 22B and 24B is always provided on opposite surfaces with electrode coatings. The method for determining zone of impact in the embodiment is similar to the method described above wherein transducer 12 covers only one zone of the target.

If a baseball, or other object whose zone of impact on the target is to be determined, strikes transducer 12A directly, a total output voltage $V_{0A}$ is generated. Because transducer 12A is layered in negative series opposed configuration, as described in the first embodiment, the polarity of the total output voltage, $V_{0A}$, is negative. This negative value for $V_{0A}$ is transmitted through electrical conductor 28 to comparator 34 (see FIG. 10). Comparator 34 compares the signal $V_{0A}$ to a predetermined reference level to ensure that the signal is not a false signal caused by noise or vibration of the target. If signal $V_{0A}$ is of a greater magnitude than the comparator 34 reference level, comparator 34 produces the negative output signal $V_{0A}$ which is input into a polarity detector 26 and the device indicates that a "strike" was thrown.

If the object strikes transducer 12B directly (i.e., a "ball" is thrown), the force of the impact causes a change in the surface charge density of each of the film layers 22B, 24B, just as described above in the first embodiment. Voltages $V_1$ and $V_2$ appear between the electrode coatings of films 22B and 24B, respectively, and the total output voltage $V_{0B}$ equals the sum of $V_1$ and $V_2$. However, in this case, because films 22B and 24B are layered in positive series opposed configuration, the polarity of the total output voltage $V_{0B}$ is positive. From Kirchoff's Voltage Law, $-V_2+V_1+V_{0B}=0$, or $V_{0B}=V_2-V_1$, where $V_1$ is the voltage produced across the electrode coatings of film 22B, $V_2$ is the voltage produced across the electrode coatings of film 24B, and $V_{0B}$ is the total output voltage. When a "ball" is thrown, $V_2$ will be greater than $V_1$, as a result of the structure of transducer 12B. Thus, a positive value for $V_{0B}$ is transmitted through electrical conductor 30 to comparator 34' (see FIG. 10). Comparator 34' establishes whether or not the signal $V_{0B}$ is a false signal in the same manner as described for signal $V_{0B}$ from transducer 12A and comparator 34. If $V_{0B}$ is a true impact-generated signal, comparator 34' produces the positive output signal $V_{0B}$ which is input into polarity detector 26 and the device indicates to the user that a "ball" was thrown.

In all three cases described above, only the first peak of the voltage signal generated upon impact is utilized. Alternatively, the zone of impact of an object 32 on a target may be determined by using an amplitude comparison. Only one zone (either strike or ball) is covered by transducer 12 (see FIGS. 2 and 3). The strike and ball areas are mechanically decoupled to minimize mechanical cross-talk between the strike and ball zones.

Figure 11:
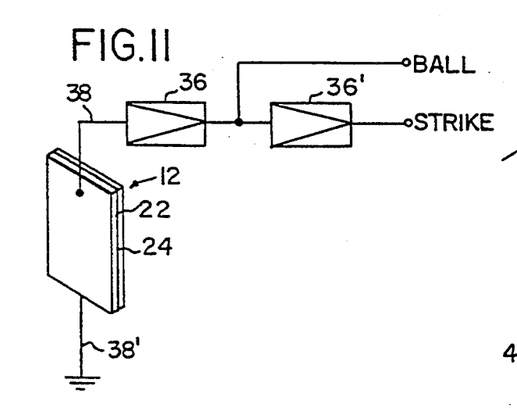
FIG. 11 is a schematic diagram of the signal processing circuit for a second embodiment of the present invention.

In operation, considering for illustration purposes the case wherein transducer 12 covers the strike zone of the target (as shown in FIG. 2), transducer 12 is connected between a comparator 36 and ground by electrical conductors 38 and 38', respectively (See FIG. 11). A baseball, or other object whose zone of impact on the target is to be determined, is directed at the target. When the object strikes transducer 12, a signal is generated. As seen in FIG. 11, this signal is transmitted first through comparator 36 which compares the amplitude of signal to a predetermined reference level to ensure that the signal is not a false signal caused by vibration of the target, or by noise. If the amplitude of the signal is of greater magnitude than the comparator 36 reference level, comparator 36 produces an output signal. The output signal is then input into a comparator 36' which has a predetermined reference level that is higher than the reference level of comparator 36. Comparator 36' differentiates between the amplitude of a signal generated when object 32 strikes transducer 12 directly, and the amplitude of a signal generated when object 32 strikes part of the target not covered by transducer 12. Because mechanical decoupling of the strike and ball zones is not one hundred percent efficient, there will be some deformation of the piezoelectric film when the surface not covered with piezoelectric film is struck. In the case of both a direct and an indirect hit transducer 12 will output a signal with a given polarity and amplitude. A direct hit on transducer 12 generates a signal having an amplitude of greater magnitude than the amplitude of a signal generated by an indirect hit. The amplitude of the output signal generated by a direct hit on transducer 12 is greater than the predetermined reference levels of both comparators 36 and 36'. Comparator 36' then produces an output signal and device 10 indicates that a "strike" was thrown. If object 32 strikes the ball zone of the target, not covered by transducer 12, the amplitude of the signal generated is of greater magnitude than the predetermined reference level of comparator 36, but less than the predetermined reference level of comparator 36'. Therefore, only comparator 36 will produce an output signal and device 10 indicates a "ball" is thrown.

The same result can be achieved by covering the entire ball zone of the baseball target with a transducer 12 while leaving the strike zone uncovered. In this case a direct hit on the transducer (i.e., a "ball") would generate an output signal with an amplitude of greater magnitude than the predetermined reference levels of both comparators 36 and 36'. Comparator 36' then produces an output signal and device 10 indicates that a "ball" is thrown. Likewise, when object 32 strikes the target in the uncovered strike zone, an output signal is generated having an amplitude of greater magnitude than the predetermined reference level of comparator 36 but not greater than the reference level of comparator 36'. Therefore, only comparator 36 will produce an output signal and device 10 indicates that a "strike" is thrown.

Alternatively, instead of covering only one zone of the target with a transducer 12, both the strike and ball zones of the target may be covered, for example, with piezoelectric bimorph transducers 12A and 12B. Transducers 12A and 12B are connected to a comparator 40 by two pairs of electrical conductors. As seen in the diagram in FIG. 12, electrical conductors 42 and 42' connect transducer 12A to comparator 40 and to ground, respectively. Electrical conductors 44 and 44' connect transducer 12B to comparator 40 and to ground, respectively. Comparator 40 is used to determine which zone is struck. When object 32 strikes the target, both transducers 12A and 12B will generate an output signal. Depending on which transducer was directly struck by object 32, one of the output signals will have an amplitude of greater magnitude than the other. If, for example, object 32 strikes transducer 12A, the amplitude of the output signal generated by transducer 12A will be of greater magnitude than the amplitude of the output signal generated by transducer 12B. The output signals of both transducers 12A, 12B are compared by comparator 40 to determine which signal has the amplitude of greater magnitude and, thus, which zone on the target was struck.

Figure 12:
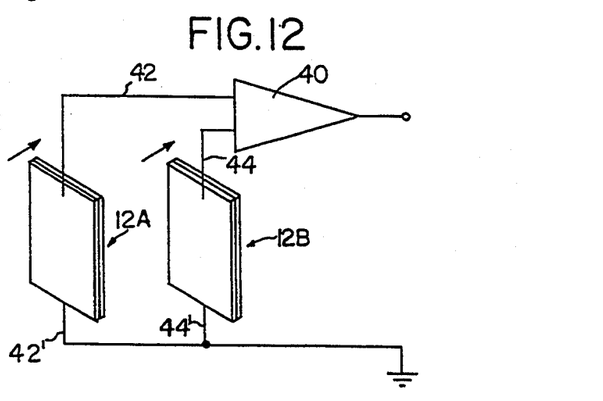
FIG. 12 is a schematic diagram of the signal processing circuit for a third embodiment of the present invention.
Figure 13:
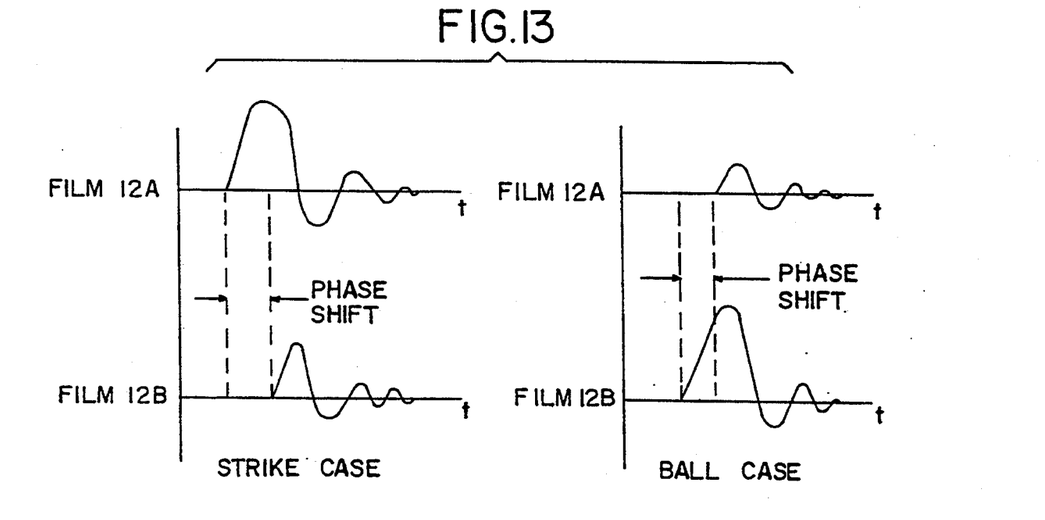
FIGS. 13A and 13B are diagrams showing the time delay response of a fourth embodiment of the present invention.

In a fourth embodiment, zone of impact is determined using a time delay detector. Both the strike and ball zone areas are covered by a bimorph transducer 12A and 12B as shown in FIG. 12. The strike and ball zones are mechanically coupled. Mechanical coupling will allow a shock wave caused by a direct hit on one zone to propagate through that zone and across to the zone not struck. For example, upon a direct hit of transducer 12A covering the strike zone, a shock wave is generated in the film and an output signal is produced. The amplitude of the output signal rises first. The shock wave then propagates through the impacted film to the unimpacted film of transducer 12B causing transducer 12B to generate an output signal. (See FIG. 13A). There is a phase shift between the rise of the amplitude of the first signal generated by transducer 12A and the rise of the amplitude of the second signal generated by transducer 12B. By using the time delay constants due to propagation of a shock wave through a particular material, a time delay detector calculates and then indicates to the user which zone has been impacted by object 32.

Figure 14:
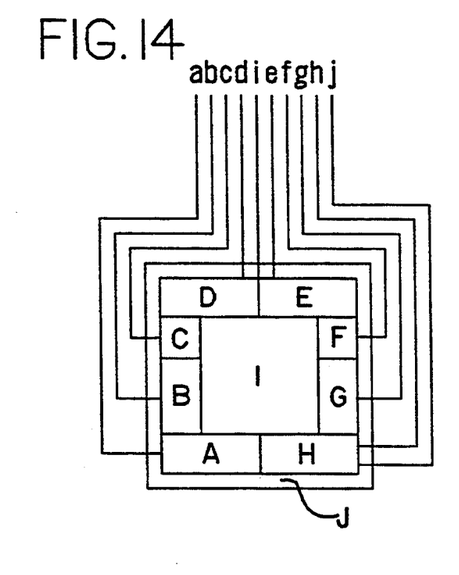
FIG. 14 is a diagram illustrating an impact detector with a separate transducer at each of a multiple of discrete impact zones.

In certain situations it may be preferable to provide more than two distinct target zones for the apparatus. For example, in golf or archery, a bullseye target having a number of circular concentric zones may be desired. FIG. 14 shows a multiple target zone arrangement for baseball, but the invention is not limited to baseball or any other use. Although baseball is used to illustrate the invention, the invention is applicable to any activity in which impact zone detection is desired. In FIG. 14, the general rectangular strike zone is defined, and within the boundaries of the strike zone are a number of smaller zones at which a pitcher might wish to aim. Each of the nine zones A–J comprises an individual, discrete transducer. The transducers in the nine zones A–J shown in FIG. 14 preferably share a common terminal (not shown) or ground plane and each zone is provided with its own individual lead (marked a–j in FIG. 14).

In this multi-zone embodiment, the exact zone that is struck by an object can be determined by comparing the output voltages from the various zones. The zone of impact will produce the largest measured charge or voltage output. A problem arises, however, if the individual transducers corresponding to the various impact zones do not have equal areas. As mentioned above, the signal processing means of the present invention preferably operates on the principle of voltage detection. Because $V=Q/C$ (the voltage produced at the output terminal of the transducer is equal to the charge induced by the impact divided by the capacitance of the transducer), and because the capacitance C is proportional to the area of the transducer, transducers of different areas will produce different output voltages for the same impact. This could lead to errors in detection. To avoid errors, the voltage inputs to the signal detection means must be "normalized" so that the voltage inputs are independent of the area of each transducer.

Figure 15A:
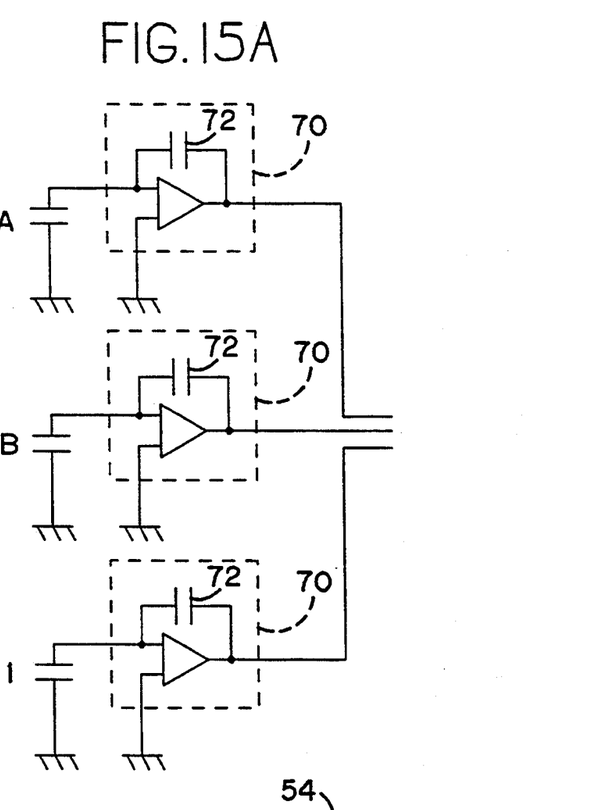
FIGS. 15A and 15B are schematic diagrams of two different circuits for processing the output signals from the transducers of FIG. 14.

One way of generating voltage signals independent of transducer area is to detect charge output. With this technique, shown in FIG. 15A, each piezoelectric transducer (shown as a capacitor) has associated with it a charge amplifier 70. Each charge amplifier 70 accepts as an input the electric charge produced by its associated transducer A–J upon the impact of an object. For all the charge amplifiers 70, the feedback capacitances 72 are equal. The charge produced is a function of impact force and is independent of transducer surface area. The output from each charge amplifier 70 is thus a voltage signal independent of transducer surface area. The outputs of the charge amplifiers are proportional to the magnitude of the input charge, which is independent of the area of the transducer.

Figure 15B:
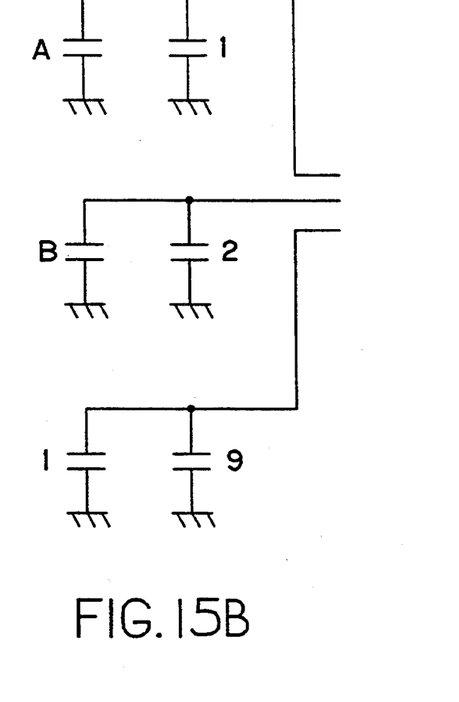

An alternate technique is to compensate for the different capacitances of each transducer using external discrete capacitors across the output of each transducer. This technique is shown schematically in FIG. 15B. In parallel with each transducer is a capacitor. The capacitance of the external capacitors $C_1 \ldots C_9$ is determined so as to maintain the equality when $C_A+C_1=C_B+C_2=C_C+C_3=\ldots C_I+C_9=C_{balance}$, where $C_A, C_B, \ldots C_I$ represent the capacitances of the transducers and $C_1, C_2, \ldots C_9$ represent the capacitance of the external capacitors. Thus, each transducer is caused to have a given apparent capacitance at the input to the processing circuitry, regardless of its surface area and, therefore, its actual capacitance. Hence, outputs from the transducers are normalized and independent of surface area.

With the transducer outputs "normalized" the voltage output of the various transducers can be directly compared in a microprocessor to determine the transducer having the highest voltage output. The above-mentioned techniques of determining a hit to a particular transducer (by phase shift, magnitude comparison, etc.) may also be applied to the multi-zone embodiment.

Figure 16:
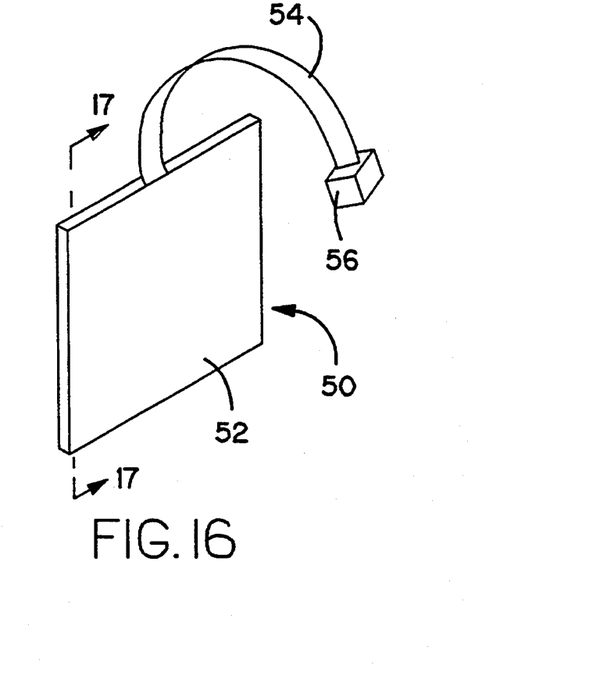
FIG. 16 is a perspective view of one way of packaging the transducers of the present invention.

The present invention, whether of the single-transducer or multi-transducer type, may be embodied in a single self-contained package, as shown in FIG. 16. The package 50 comprises a target surface 52, a cable 54, and a connector 56.

Figures 17, 18, 19:
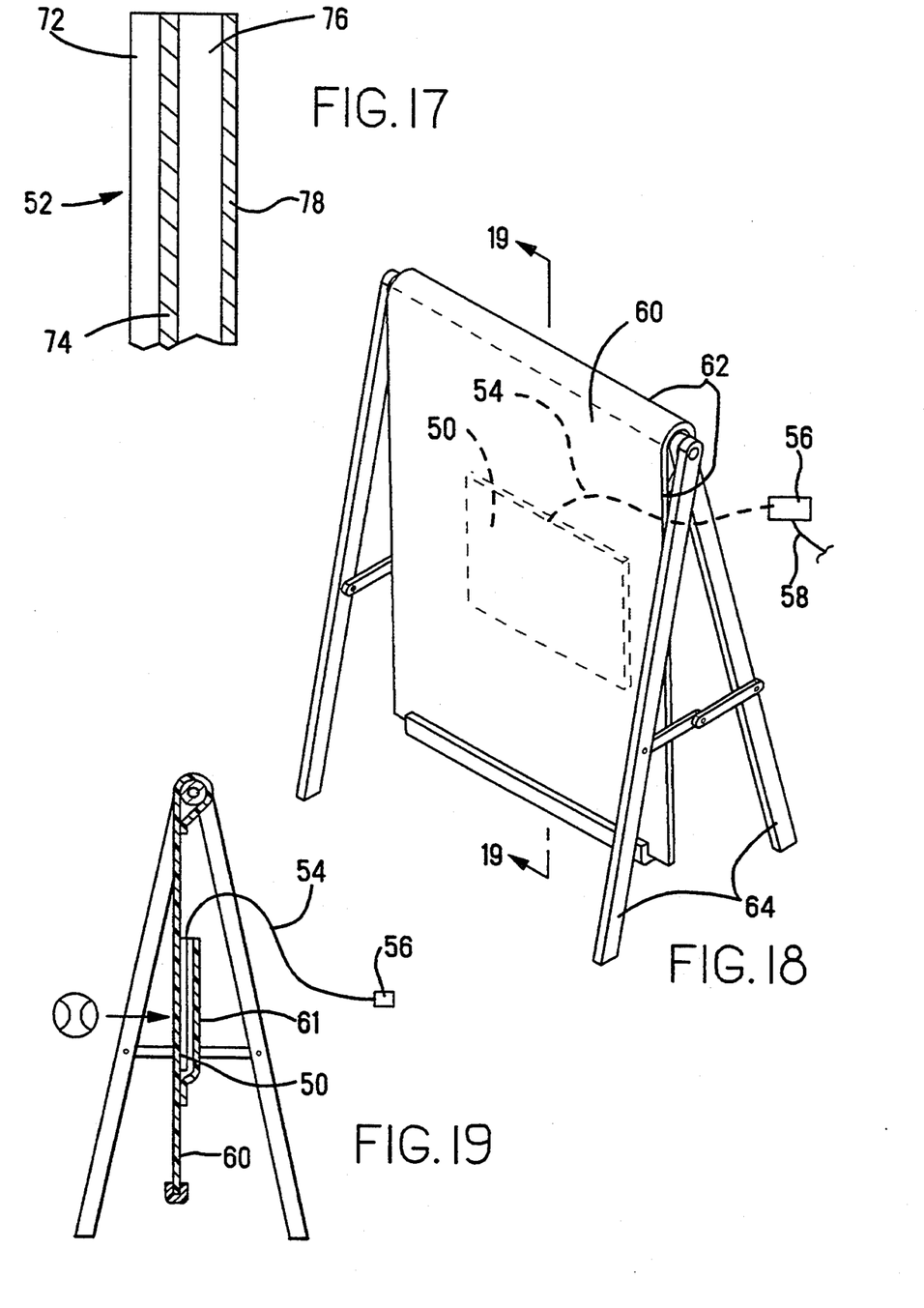
FIG. 17 is a cross-sectional view through line 17—17 of FIG. 16.
FIG. 18 is a perspective view of one embodiment of the impact zone detection device of the present invention, using the impact detector of FIG. 14.
FIG. 19 is a cross-sectional view through line 19—19 of FIG. 18.

The target surface 52 preferably comprises a layered structure as shown in cross-section in FIG. 17. A base layer 72 of plastic, such as that sold under the trademark "Lexan ®", preferably of a thickness of 0.04 inches, for example, is included to provide rigidity and durability. Adjacent the base layer is a first protective layer 74 of plastic film such as that sold under the trademark "Mylar ®", preferably 5 mil thick. Next to the protective layer is the piezoelectric transducer 76, either as a single layer of piezoelectric film or a plurality of layers, if the embodiment is of a bimorph or multimorph structure. The piezoelectric transducers are preferably made of a piezoelectric film such as that sold under the trademark "Kynar ®". Each layer of piezoelectric film includes conductive surfaces (not shown) on both sides. Adjacent the piezoelectric layer is a second protective layer 78 of plastic film. The purpose of the protective layers 74 and 78 on either side of the transducer or transducers is to protect the conductive surfaces on the piezoelectric film. All of these layers are preferably joined together by an adhesive, such as "444 ®" double-sided tape.

In use, the side of the target surface having the base layer is exposed to the direct impact of the object. The layered structure of the target provides an inexpensive, yet durable, impact zone. The various leads a-j to the individual transducers A-J within the package 50 are passed through the cable 54 and connector 56. Connector 56 connects with a corresponding connector leading to the circuitry of the signal detection means. It is generally preferable to have the circuitry of the signal detection means spaced a safe distance away from the impact zone.

In the baseball context illustrated in FIG. 18, (in FIG. 18, the package 50 is shown through the screen 60) the target area defined by the transducers is preferably coextensive with a typical baseball strike zone. The transducer I shown in FIG. 14 corresponds to the area in which a pitched baseball is likely to be hit, while the smaller transducers marked A-H correspond to the areas around the inside perimeter a typical strike zone (high inside, low outside, etc.), and the transducer J corresponds to a "ball" area around the outside of the strike zone. The peripheral areas within the strike zone are the areas of most interest to pitchers. Through use of the present invention, a pitcher can immediately know precisely which of the areas around the strike zone he has struck with the ball.

In the event that the pitched ball misses the target area completely, a situation analogous to a "wild pitch", the ball will strike the cloth screen 60 without directly hitting any transducer. The effect of a "wild pitch" is that each of the transducers in the package 50 will register a small vibration through the medium of the screen 60. However, because no transducer has been hit directly, no individual transducer will produce an electrical output particularly higher or sooner than any of the other transducers. The signal detection means will detect a number of relatively small signals from a number of transducers, if not all of the transducers. The signal detection means may be programmed to detect such a situation of numerous relatively small electrical outputs, and recognize the situation as a "wild pitch". In the preferred embodiment of the invention, the positive signal outputs of each transducer are summed. If the amplitude of the summed signal is smaller than a predetermined threshold level, a wild pitch is registered. Similarly, in other contexts, such as archery, wherein the target area forms only part of the entire cloth screen, a situation in which the cloth but not the target area is hit can be detected.

For use with baseball pitching, for example, it is preferable to mount package 50 against a heavy cloth screen 60. The package 50 may conveniently be mounted on screen 60 by simply inserting the package 50 into a pocket 61 sewn into the screen 60 on the side opposite that from which the ball will be thrown, as seen in FIG. 19. Other means of affixing the package 50 to an impact surface may be provided as well, including gluing the package to the surface with an adhesive, or sewing the package to the cloth 60. Cable 54 is preferably folded back so as not to be exposed to the shock of impact. Connector 56 is then connected to a second cable 58, which connects to the signal processing means. The screen 60, which is preferably made from a heavy cloth such as canvas, is mounted upright by a conventional means, such as the frame 62 shown in FIG. 18. The screen may be weighted down with a weight such as rod 64.

In the baseball context, the preferred embodiment shown in FIG. 19 has been shown to provide a pitching device which is inexpensive and easy to use and repair. This embodiment is more accurate than other devices in practical use.

The present invention may be embodied in other specific forms without departing from the spirit or essential attributes thereof and, accordingly, reference should be made to the appended claims, rather than to the foregoing specification, as indicating the scope of the invention.

We claim:

1. Apparatus for detecting the impact of an object in an impact area, at least a portion of the impact area comprising a plurality of impact zones, comprising:
   (a) a plurality of transducers, each having a surface coextensive with one impact zone, each transducer including a layer of piezoelectric film having first and second surfaces, the first and second surfaces having opposite polarity; and
   (b) signal processing means responsive to the transducers, adapted to detect electrical outputs from the transducers, thereby determining which impact zone, if any, is struck by the object, wherein the signal processing means includes means for detecting a time delay among electrical outputs from the plurality of transducers.

2. Apparatus for detecting the impact of an object in an impact area, at least a portion of the impact area comprising a plurality of impact zones, comprising:

(a) a plurality of transducers, each having a surface coextensive with one impact zone, each transducer including a layer of piezoelectric film having first and second surfaces, the first and second surfaces having opposite polarity, said film, in and of itself, generating an electrical output signal upon impact by an object, and (b) signal processing means responsive to the transducers and adapted to detect said electrical outputs from the transducers, said response determining, from only said output signals, the location within said plurality of impact zones that is struck by the object, wherein the signal processing means includes means for comparing the relative magnitude of electrical outputs from the plurality of transducers.

3. Apparatus for detecting the impact of an object in an impact area, at least a portion of the impact area comprising a plurality of impact zones, comprising:

(a) a plurality of transducers, each having a surface coextensive with one impact zone, each transducer including:

(i) a first layer of piezoelectric film having first and second surfaces, the first and second surfaces having opposite polarities, said first layer, in and of itself, generating electrical output upon impact by an object, (ii) a second layer of piezoelectric film having first and second surfaces, disposed adjacent to the first layer so that opposing faces of the first and second piezoelectric layers have similar polarities, said second layer, in and of itself, generating an electrical output upon impact by said object; and (b) signal processing means responsive to the transducers and adapted to detect voltages from the transducers, and voltage differences between the first and second layers of piezoelectric film in each of the transducers, said voltages from said transducers and said voltage differences from said piezoelectric layers determining the location within said plurality of zones that is struck by the object.

4. Apparatus as in claim 3, wherein the signal processing means includes means for comparing the relative magnitude of voltages output from the plurality of transducers.

5. Apparatus for detecting the impact of an object in an impact area, at least a portion of the impact area comprising a plurality of impact zones, comprising:

(a) a plurality of transducers, each having a surface coextensive with one impact zone, each transducer including:

(i) a first layer of piezoelectric film having first and second surfaces, the first and second surfaces having opposite polarities, (ii) a second layer of piezoelectric film having first and second surfaces, disposed adjacent to the first layer so that opposing faces of the first and second piezoelectric layers have similar polarities; and (b) signal processing means responsive to the transducers, adapted to detect voltages from the transducers, and voltage differences between first and second layers of piezoelectric film in each of the transducers, thereby determining which zone, if any, is struck by the object, wherein the signal processing means includes means for detecting a time delay among voltage signals from the plurality of transducers.

* * * * *